(12) United States Patent
Igarashi et al.

(10) Patent No.: US 12,143,157 B2
(45) Date of Patent: Nov. 12, 2024

(54) BRANCH RATIO SETTING SYSTEM, METHOD FOR PRODUCING OPTICAL COMMUNICATION SYSTEM AND OPTICAL BRANCH DEVICE

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Takuya Kanai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 117 days.

(21) Appl. No.: 18/016,704

(22) PCT Filed: Jul. 29, 2020

(86) PCT No.: PCT/JP2020/029041
§ 371 (c)(1),
(2) Date: Jan. 18, 2023

(87) PCT Pub. No.: WO2022/024256
PCT Pub. Date: Feb. 3, 2022

(65) Prior Publication Data
US 2023/0291484 A1 Sep. 14, 2023

(51) Int. Cl.
*H04B 10/272* (2013.01)
*H04B 10/278* (2013.01)
*H04B 10/61* (2013.01)

(52) U.S. Cl.
CPC ......... *H04B 10/614* (2013.01); *H04B 10/272* (2013.01); *H04B 10/278* (2013.01)

(58) Field of Classification Search
None
See application file for complete search history.

(56) References Cited

U.S. PATENT DOCUMENTS

| 7,519,241 B2 * | 4/2009 | Doi | G02F 1/3136 |
| | | | 385/40 |
| 7,933,517 B2 * | 4/2011 | Ye | H04B 10/07955 |
| | | | 398/19 |

(Continued)

FOREIGN PATENT DOCUMENTS

| JP | 2007116598 A | 5/2007 |
| JP | 2011-188059 A | 9/2011 |

(Continued)

OTHER PUBLICATIONS

P. Lafata et al., "Perspective Application of Passive Optical Network with Optimized Bus Topology", Journal of Applied Research and Technology, vol. 10, No. 3, pp. 340-345, Jun. 2012.

(Continued)

*Primary Examiner* — Jai M Lee
(74) *Attorney, Agent, or Firm* — Harness, Dickey & Pierce, P.L.C.

(57) ABSTRACT

A branch ratio setting system includes: a branch ratio control unit; and a plurality of drop units configured to be able to receive an optical signal from the branch ratio control unit, and configured to branch and output the received optical signal, and the branch ratio control unit outputs light to the plurality of drop units via an optical fiber to measure characteristics of the optical fiber, and outputs a branch ratio determination signal to each of the plurality of drop units via the optical fiber based on the measured characteristics of the optical fiber, and the drop unit includes an optical splitter connected to the optical fiber and having a variable branch ratio and a branch ratio setting unit that sets the branch ratio (Continued)

of the optical splitter based on the branch ratio determination signal input via the optical fiber.

5 Claims, 9 Drawing Sheets

(56) References Cited

U.S. PATENT DOCUMENTS

| | | | | |
|---|---|---|---|---|
| 8,145,054 | B2* | 3/2012 | Ye | H04B 10/07955 |
| | | | | 398/19 |
| 9,164,242 | B1* | 10/2015 | Li | G02B 6/34 |
| 11,290,189 | B2* | 3/2022 | Kawakita | H04Q 11/0067 |
| 2003/0095314 | A1* | 5/2003 | Shimada | H04B 10/27 |
| | | | | 398/141 |
| 2004/0184696 | A1* | 9/2004 | Miao | G02B 6/2817 |
| | | | | 385/11 |
| 2021/0194589 | A1* | 6/2021 | Kawakita | H04L 12/44 |

FOREIGN PATENT DOCUMENTS

| | | |
|---|---|---|
| JP | 2012237590 A | 12/2012 |
| WO | WO-2020/045185 A1 | 3/2020 |

OTHER PUBLICATIONS

Z. Yun et al., "A1 × 2 Variable Optical Power Splitter Development", J. Lightw., Technol., vol. 24, No. 3, pp. 1566-1570, Mar. 2006.

\* cited by examiner

BRANCH RATIO SETTING SYSTEM, METHOD FOR PRODUCING OPTICAL COMMUNICATION SYSTEM AND OPTICAL BRANCH DEVICE

CROSS-REFERENCE TO RELATED APPLICATIONS

This application is a 371 U.S. National Phase of International Application No. PCT/JP2020/029041, filed on Jul. 29, 2020. The entire disclosure of the above application is incorporated herein by reference.

TECHNICAL FIELD

The present invention relates to a branch ratio setting system, a method for producing an optical communication system and an optical branch device.

BACKGROUND ART

There is a passive optical network (PON) system as a method of optical communication. In optical communication using a PON, an optical line terminal (OLT) installed on a station side of a communication company and an optical network unit (ONU) installed on a subscriber's house side are connected by an optical fiber. An optical splitter is provided in the middle of the optical fiber, and the optical splitter separates and synthesizes optical signals transmitted and received between the OLT and the ONU.

FIG. 6 is a diagram showing an optical communication system 100. The optical communication system 100 includes an OLT 90, ONUs 91-1 to 91-(N+1), equally branched optical splitters 92-1, . . . 92-N, branch fibers 93-1 to 93-N, and a trunk fiber 94.

Regarding the matters common to the ONUs 91-1, . . . 91-(N+1), the "ONUs 91-1, . . . 91-(N+1)" are referred to below as an "ONU 91" by omitting a part of the reference numeral. Further, the "equally branched optical splitters 92-1, 92-N" and "branch fibers 93-1, . . . 93-N" are also similarly referred to as an "equally branched optical splitter 92" and a "branch fiber 93," respectively. The OLT 90 is installed on a station side of a communication company. The ONU 91 is installed on a subscriber's house side. The equally branched optical splitter 92 is provided with one input port and two output ports, and branches an optical signal input to one input port and outputs the branched optical signals from the two output ports. The intensities of the optical signals output from the two output ports are equal. The equally branched optical splitter 92 is provided on the trunk fiber 94.

The OLT 90 and the ONU 91-(N+1) are connected by the trunk fiber 94. The ONUs 91-1 to 91-N are connected to the equally branched optical splitter 92 provided in the trunk fiber 94 by the branch fibers 93-1 to 93-N, respectively. The equally branched optical splitter 92 branches the optical signal (downlink signal) transmitted from the OLT 90 side, and outputs the branched downlink signals to the connected branch fiber 93 and the trunk fiber 94. Further, two downlink signals generated as a result of the branching of the downlink signal by the equally branched optical splitter 92 are equal in intensity. Therefore, the intensity of the downlink signal generated as a result of the branching of the downlink signal by the equally branched optical splitter 92 is half the intensity of the downlink signal to be branched. Similarly, the equally branched optical splitter 92 branches the optical signal (uplink signal) transmitted from the ONU 91 and outputs the branched uplink signals to the trunk fiber 94. Two uplink signals generated as a result of the branching of the uplink signal by the equally branched optical splitter 92 are equal in intensity. Therefore, as in the case of the uplink signal, the intensity of the uplink signal generated as a result of the branching of the uplink signal by the equally branched optical splitter 92 is half the intensity of the uplink signal to be branched.

FIG. 7 is a diagram showing the intensities of the optical signals received by the ONUs 91-1, . . . 91-3.

In FIG. 7, $P_{tx}$ is the intensity of the optical signal transmitted by the OLT, $P_{min}$ is the minimum reception sensitivity required for the ONU 91 to receive the optical signal without error, and $P_1$, $P_2$, and $P_3$ are the intensities of the optical signals received by the ONU 91-1, the ONU 91-2, and the ONU 91-3, respectively. A transmission distance is a distance between the OLT 90 and each point of the trunk fiber 94.

The graph shown in FIG. 7 is a graph showing the relationship between a transmission distance and a light intensity when $P_{tx}=+4$ dBm, $P_{min}=-18$ dBm, a transmission loss a of the trunk fiber 14 is 0.5 dBm/km, a distance D between the two most recent equally branched optical splitters 92 is 10 km, and a distance L of the branch fiber 93 is 0 km.

Since the optical signal transmitted by the OLT 90 receives a transmission loss due to the trunk fiber 14 and is branched by the equally branched optical splitter 92, the intensity of the optical signal received by the ONU 91 becomes weaker as the transmission distance from the OLT 90 is longer or the number of equally branched optical splitters 92 through which the optical signal passes is larger. In FIG. 7, $P_1=-4$ dBm, $P_2=-12$ dBm, $P_3=-21$ dBm, and $P_1$ and $P_2$ are larger than $P_{min}$. Therefore, the ONU 91-1 and the ONU 91-2 can correctly receive the optical signal from the OLT 90, but since $P_3$ is smaller than $P_{min}$, the ONU 91-3 cannot correctly receive the optical signal from the OLT 90.

As a method for solving this problem and transmitting an optical signal a further distance, it has been proposed to use an unequally branched optical splitter whose branch ratio is not symmetrical (for example, NPL 1). FIG. 8 is a diagram showing an optical communication system 100 using an unequally branched optical splitter 95. The optical communication system 100 shown in FIG. 8 has a configuration in which the equally branched optical splitter 92 in the optical communication system 100 shown in FIG. 6 is replaced with an unequally branched optical splitter 95. The unequally branched optical splitter 95 is provided with one input port and two output ports, and branches an optical signal input to one input port and outputs the branched optical signals from the two output ports. The unequally branched optical splitter 95 is different from the equally branched optical splitter 92 in that the intensities of the optical signals output from the two output ports are not necessarily equal.

For example, in the example shown in FIG. 8, an unequally branched optical splitter 95-1 branches an optical signal transmitted from the OLT 90, outputs an optical signal having an intensity ratio of 2% to the ONU 91-1, and outputs an optical signal having a remaining intensity ratio of 98% to an unequally branched optical splitter 95-2. The unequally branched optical splitter 95-2 branches an optical signal transmitted from the OLT 90 side, outputs an optical signal having an intensity ratio of 6% to the ONU 91-2, and outputs an optical signal having a remaining intensity ratio of 94% to an unequally branched optical splitter 95-3. The unequally branched optical splitter 95-3 branches an optical signal transmitted from the OLT 90 side, outputs an optical signal having an intensity ratio of 20% to the ONU 91-3, and outputs an optical signal having a remaining intensity ratio of 80% to an unequally branched optical splitter 95-4.

In the optical communication system 100 shown in FIG. 8, the unequally branched optical splitter 95 close to the OLT 90 adjusts a branch ratio so that the intensity of the optical signal output to a trunk fiber 94 becomes large, thereby suppressing the intensity of the optical signal received by the ONU 91 from being reduced by branching the optical signal transmitted by the OLT 90. FIG. 9 is a graph showing the relationship between a transmission distance and a light intensity in the optical communication system 100 shown in FIG. 8. The conditions other than the branch ratio of the optical splitter in FIG. 9 are the same as those in the graph of FIG. 7, and $P_{tx}$=+4 dBm, $P_{min}$=−18 dBm, the transmission loss a of the trunk fiber 14 is 0.5 dBm/km, the distance D between the two most recent equally branched optical splitters 92 is 10 km, and the distance L of the branch fiber 93 is 0 km. In FIG. 9, $P_1$=−18 dBm, and $P_2$ and $P_3$ are also approximately-18 dBm. Therefore, the ONU 91-3 can also correctly receive the optical signal from the OLT 90. Further, by reducing the intensity of the optical signal propagating through the branch fiber 94, the intensity of the light propagating through the trunk fiber 93 can be relatively increased, and the OLT 90 can transmit the optical signal to the ONU 91 located farther.

The optimum branch ratio of the unequally branched optical splitter 95 is changed according to the number of ONUs 91 and the number of unequally branched optical splitters 95 provided in the optical communication system 100, the length of the branch fiber 93, and the length of the trunk fiber 94, and when these change, it is desirable to set the branch ratio of the unequally branched optical splitter 95 again. However, replacing the unequally branched optical splitter 95 with an optical splitter with a different branch ratio each time these change leads to an increase in maintenance costs.

As a means for solving this problem, it is conceivable to use an optical splitter (for example, NPL 2) whose branch ratio can be changed after manufacture as the unequally branched optical splitter 95, and to remotely control the branch ratio by a signal from the outside.

CITATION LIST

Non Patent Literature

[NPL 1] P. Lafata et al., "Perspective Application of Passive Optical Network with Optimized Bus Topology," Journal of Applied Research and Technology," vol. 10, no. 3, pp. 340-345, June 2012.

[NPL 2] Z. Yun et al., "A 1×2 Variable Optical Power Splitter Development," J. Lightw. Technol., vol. 24, No. 3, pp. 1566-1570, March 2006.

SUMMARY OF INVENTION

Technical Problem

However, a method for remotely controlling the branch ratio of the optical splitter has not been established.

An object of the present invention is to provide a branch ratio setting system capable of remotely controlling a branch ratio of an optical splitter.

Solution to Problem

According to one aspect of the present invention, there is provided a branch ratio setting system including: a branch ratio control unit; and a plurality of drop units configured to be able to receive an optical signal from the branch ratio control unit, and configured to branch and output the received optical signal, and the branch ratio control unit outputs light to the plurality of drop units via an optical fiber to measure characteristics of the optical fiber, and outputs a branch ratio determination signal to each of the plurality of drop units via the optical fiber based on the measured characteristics of the optical fiber, and the drop unit includes an optical splitter connected to the optical fiber and having a variable branch ratio and a branch ratio setting unit that sets the branch ratio of the optical splitter based on the branch ratio determination signal input via the optical fiber.

According to one aspect of the present invention, there is provided a method for producing an optical communication system, the method including: a system configuration step of configuring a tree structure network in which a branch ratio control unit is used as a root node and a plurality of drop units provided with an optical splitter having a variable branch ratio are used as intermediate nodes or leaf nodes; a measurement step in which the branch ratio control unit outputs light to an optical fiber connected between the branch ratio control unit and the drop unit to measure characteristics of the optical fiber; a branch ratio determination signal output step in which the branch ratio control unit outputs a branch ratio determination signal to the drop unit via the optical fiber based on the measured characteristics of the optical fiber; a branch ratio setting step in which the drop unit sets the branch ratio of the optical splitter based on the branch ratio determination signal input via the optical fiber; and a communication device preparation step of replacing the branch ratio control unit with a communication device and connecting the communication device to the optical splitter.

According to one aspect of the present invention, there is provided an optical branch device including: an optical splitter having a variable branch ratio; and a branch ratio setting unit that is connected to the optical splitter via an optical fiber and sets the branch ratio of the optical splitter based on a branch ratio determination signal input from the outside via the optical fiber.

Advantageous Effects of Invention

According to the present invention, the branch ratio of the optical splitter can be remotely controlled.

DESCRIPTION OF EMBODIMENTS

Embodiments of the present invention will be described in detail below with reference to the drawings.

First Embodiment

<<Configuration of Branch Ratio Setting System 1>>

Figure 1:
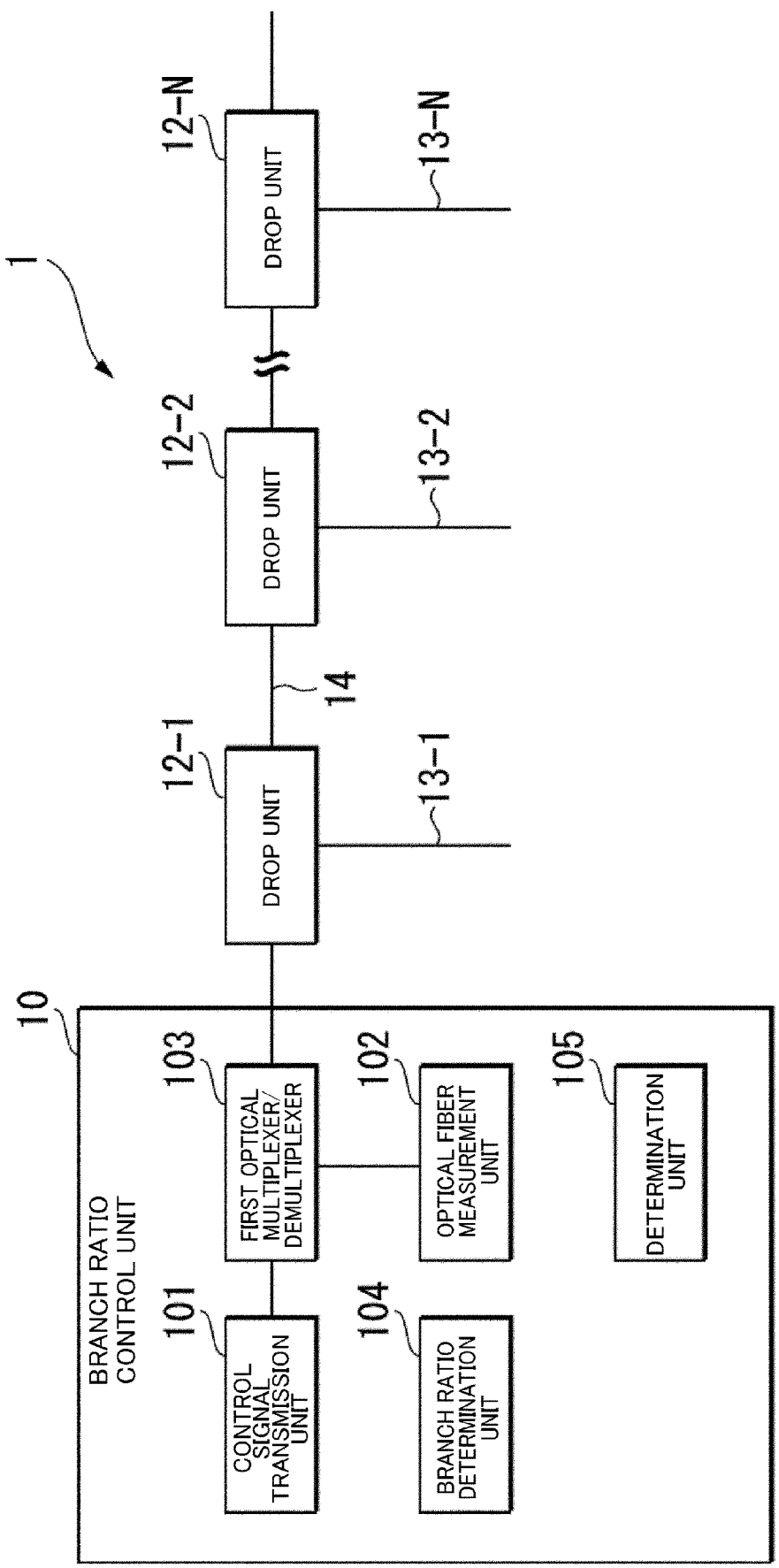
FIG. 1 is a diagram showing a configuration of a branch ratio setting system according to a first embodiment.

FIG. 1 is a diagram showing a configuration of a branch ratio setting system 1 according to a first embodiment.

The branch ratio setting system 1 is used for setting an optical communication system used for communication between an OLT and an ONU. The optical communication system configures a tree structure network in which the OLT is used as a root node, a drop unit for branching an optical signal is used as an intermediate node, and the ONU is used as a leaf node. The branch ratio setting system 1 sets a branch ratio in a drop unit 12.

The branch ratio setting system 1 includes a branch ratio control unit 10, drop units 12-1, . . . , 12-N, branch fibers 13-1, . . . 13-N, and a trunk fiber 14.

Regarding the matters common to the drop units 12-1 to 12-N, the "drop units 12-1, . . . 12-N" are referred to as below a "drop unit 12" by omitting a part of the reference numeral. Further, the "branch fibers 13-1, . . . 13-N" are also referred to as a "branch fiber 13."

Figure 6:
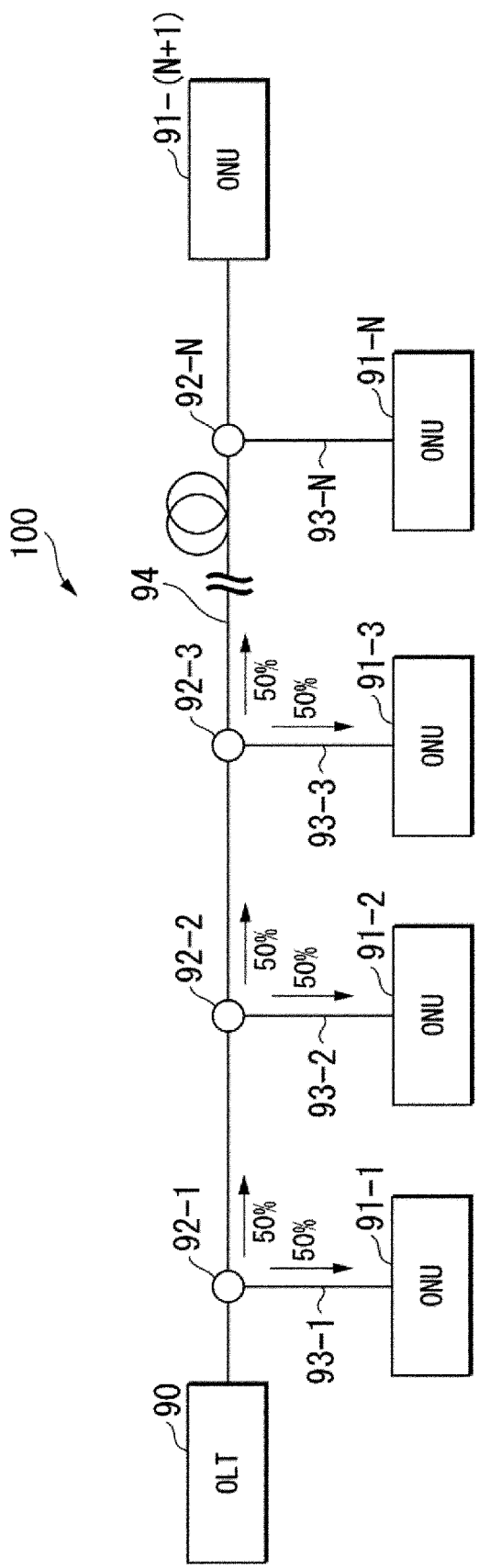
FIG. 6 is a diagram showing an optical communication system.
Figure 7:
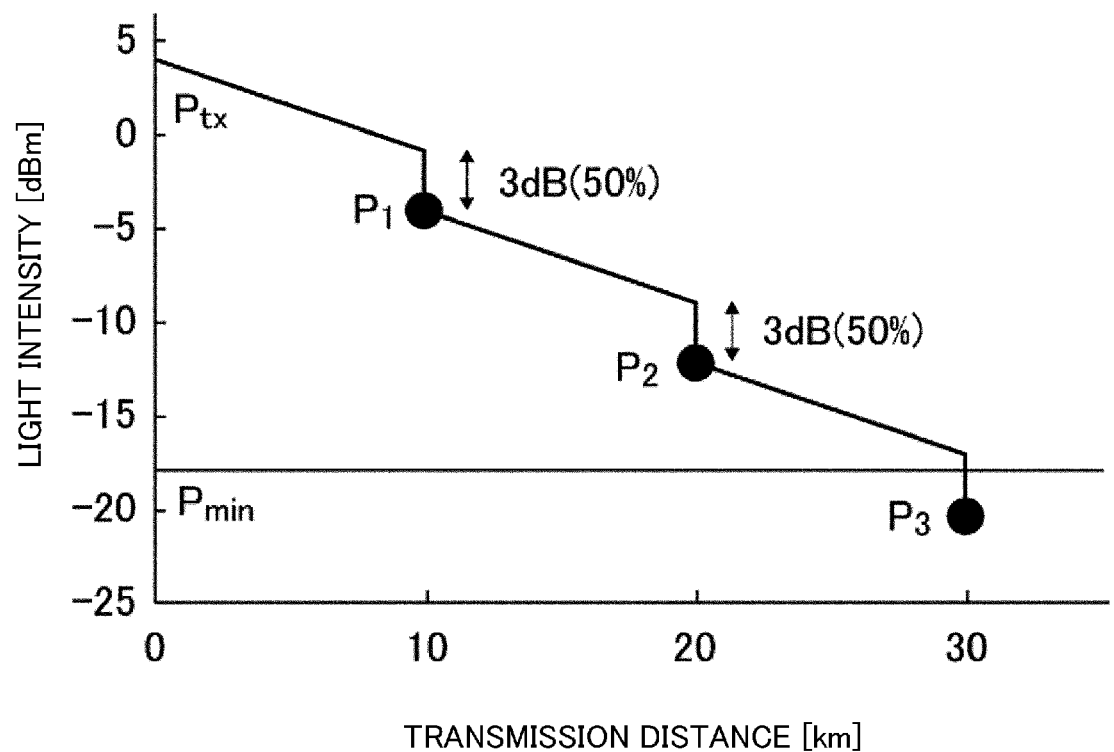
FIG. 7 is a diagram showing an intensity of an optical signal received by an ONU.
Figure 8:
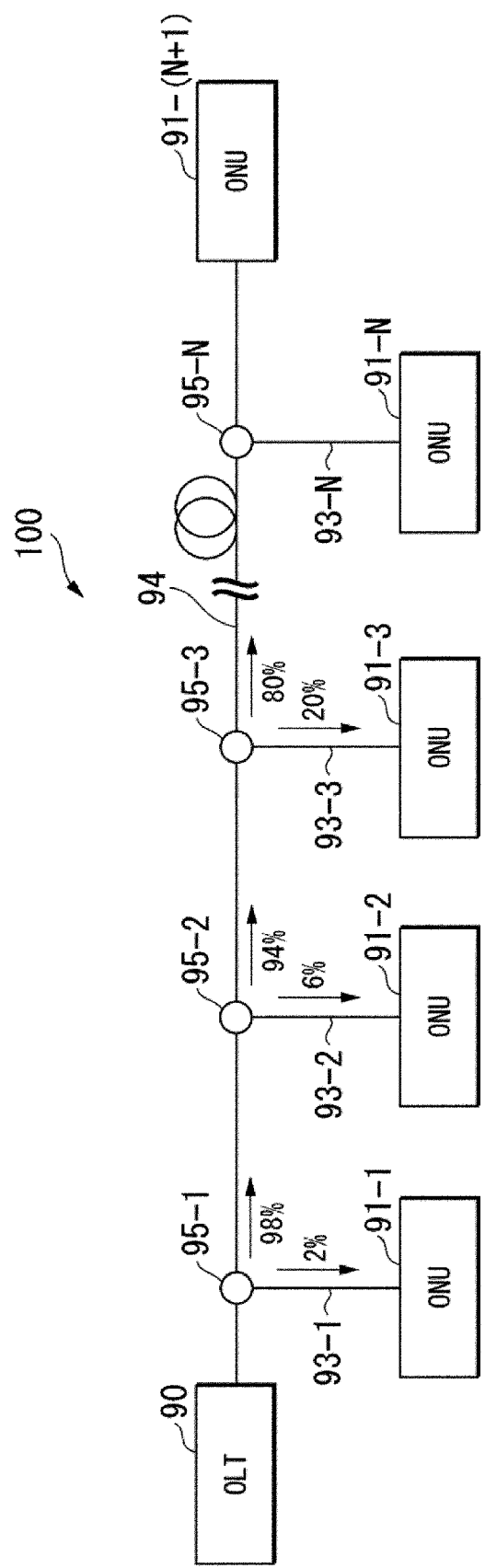
FIG. 8 is a diagram showing an optical communication system using an unequally branched optical splitter.
Figure 9:
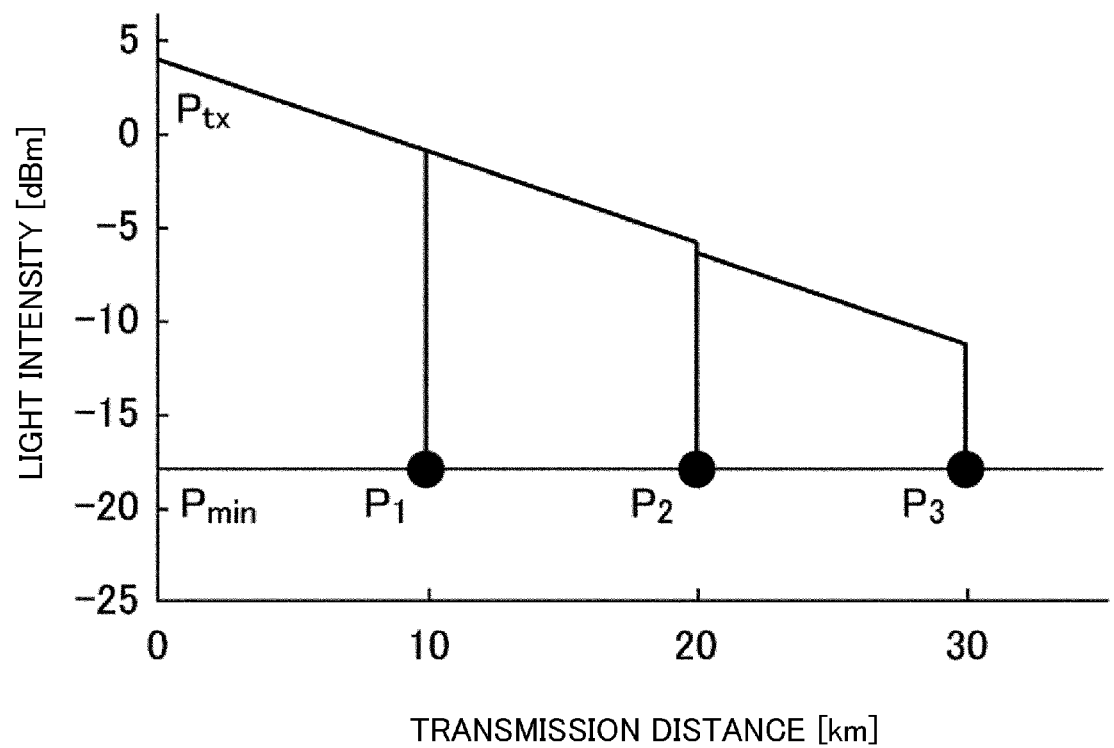
FIG. 9 is a graph showing the relationship between a transmission distance and a light intensity in the optical communication system shown in FIG. 8.

The drop units 12-1, . . . 12-N are provided on the trunk fiber 14. The branch fibers 13-1, . . . 13-N are each connected to the drop unit 12 provided on the trunk fiber 14. The drop unit 12 branches an optical signal transmitted from the branch ratio control unit 10 side, and outputs the branched optical signal to the connected branch fiber 13 and the trunk fiber 14. In other words, the branch ratio setting system 1 configures a tree structure network in which the branch ratio control unit 10 is used as a root node, the drop units 12-1, . . . 12-(N−1) are used as intermediate nodes, and the drop unit 12-N is used as a leaf node. In other words, the branch fiber 13 and the trunk fiber 14 provided in the branch ratio setting system 1 correspond to a branch fiber 93 and a trunk fiber 94 provided in an optical communication system 100 shown in FIG. 6, respectively. Further, the branch ratio control unit 10 and the drop unit 12 provided in the branch ratio setting system 1 are respectively replaced with an OLT 90 and an unequally branched optical splitter 95 in the optical communication system 100.

When a designer of the optical communication system sets a branch ratio of each drop unit 12 by using the branch ratio setting system 1, the optical communication system can be constructed by replacing the branch ratio control unit 10 with the OLT and connecting the ONU to an end point opposite to an end point connected to the drop unit 12 of the branch fiber 13. As an example of use of the branch ratio setting system 1, a system in which the branch ratio setting system 1 is first constructed when the optical communication system is constructed, the branch ratio of the optical splitter is set, and then the configuration of a part of the branch ratio setting system 1 is changed to finally construct the optical communication system can be mentioned. Further, the branch ratio setting system 1 may be used for updating the branch ratio of the optical splitter by temporarily replacing the OLT with the branch ratio control unit 10 when a drop unit 12 or an ONU is newly added to the optical communication system.

The branch ratio control unit 10 transmits a control signal to the drop unit 12 via the trunk fiber 14.

The drop unit 12 includes an optical splitter. The drop unit 12 sets the branch ratio of the optical splitter based on the control signal transmitted from the branch ratio control unit 10. The configuration of the drop unit 12 will be described later.

The branch ratio control unit 10 includes a control signal transmission unit 101, an optical fiber measurement unit 102, a first optical multiplexer/demultiplexer 103, a branch ratio determination unit 104, and a determination unit 105.

The control signal transmission unit 101 outputs a control signal to the first optical multiplexer/demultiplexer 103. The optical fiber measurement unit 102 outputs light (the light output by the optical fiber measurement unit 102 is hereinafter referred to as measured light), and measures the length of the trunk fiber 14, the loss received by the optical signal due to the trunk fiber 14, the position of the drop unit 12, and the like. As an example of the optical fiber measurement unit 102, an optical time domain reflectometer (OTDR) can be mentioned.

The first optical multiplexer/demultiplexer 103 multiplexes the control signal input from the control signal transmission unit 101 and the measured light input from the optical fiber measurement unit 102, and outputs the multiplexed signal to the drop unit 12-1. The first optical multiplexer/demultiplexer 103 demultiplexes the light input from the drop unit 12-1 and outputs the demultiplexed light to the control signal transmission unit 101 and the optical fiber measurement unit 102. The branch ratio determination unit 104 determines the branch ratio of the optical splitter provided in the drop unit 12 based on a measurement result of the optical fiber measurement unit 102. For example, there is a method of determining a branch ratio such that all ONUs connected to the branch fiber 13 receive the optical signal with the same intensity, but the present invention is not limited thereto. The determination unit 105 determines whether or not the branch ratio control unit 10 can control the drop unit 12 based on the measurement result of the optical fiber measurement unit 102.

Here, the measurement by the optical fiber measurement unit 102 will be described.

Figure 2:
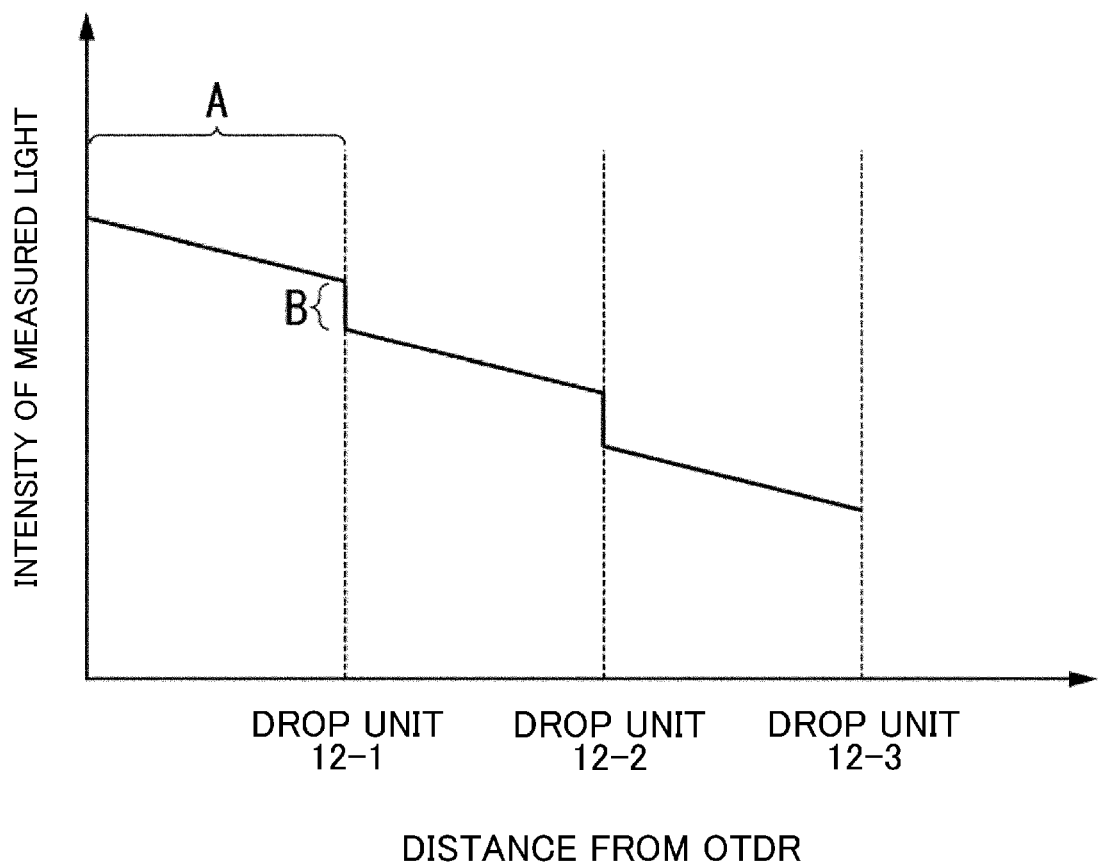
FIG. 2 is an example of a measurement result of a trunk fiber by an optical time domain reflectometer (OTDR).

FIG. 2 is an example of the measurement result of the trunk fiber 14 by the OTDR.

In the graph shown in FIG. 2, the horizontal axis represents the distance from the OTDR, and the vertical axis represents the intensity of the measured light. The OTDR outputs measured light (optical pulse signal), and measures backscattered light scattered in the optical fiber and returning to the OTDR. The OTDR calculates the intensity of the measured light from the intensity of the backscattered light. The OTDR calculates a distance between the point where the scattering occurs and the OTDR based on a difference between the time when the measured light is output and the time when the back scattering is detected.

Light output from the OTDR and propagating through the trunk fiber 14 is subjected to a loss due to the trunk fiber 14 according to the distance. The loss due to the trunk fiber 14 appears, for example, in a downward-sloping portion A in the graph shown in FIG. 2. Further, the light is branched at the drop unit 12, and a part of the light is incident on the branch fiber 13. At this branching point, the OTDR observes a loss. The loss due to the drop unit 12 appears in a portion B where the intensity decreases in parallel with the vertical axis in the graph shown in FIG. 2. In the graph shown in FIG. 2, the local change of the loss indicated by B is due to the drop unit 12. Therefore, the optical fiber measurement unit 102 can obtain the length of the trunk fiber 14 and the point where the drop unit 12 is located by referring to the horizontal axis. Further, the optical fiber measurement unit 102 can obtain a branch ratio in the drop unit 12 by measuring the amount of the attenuation of the intensity indicated by B.

Figure 3:
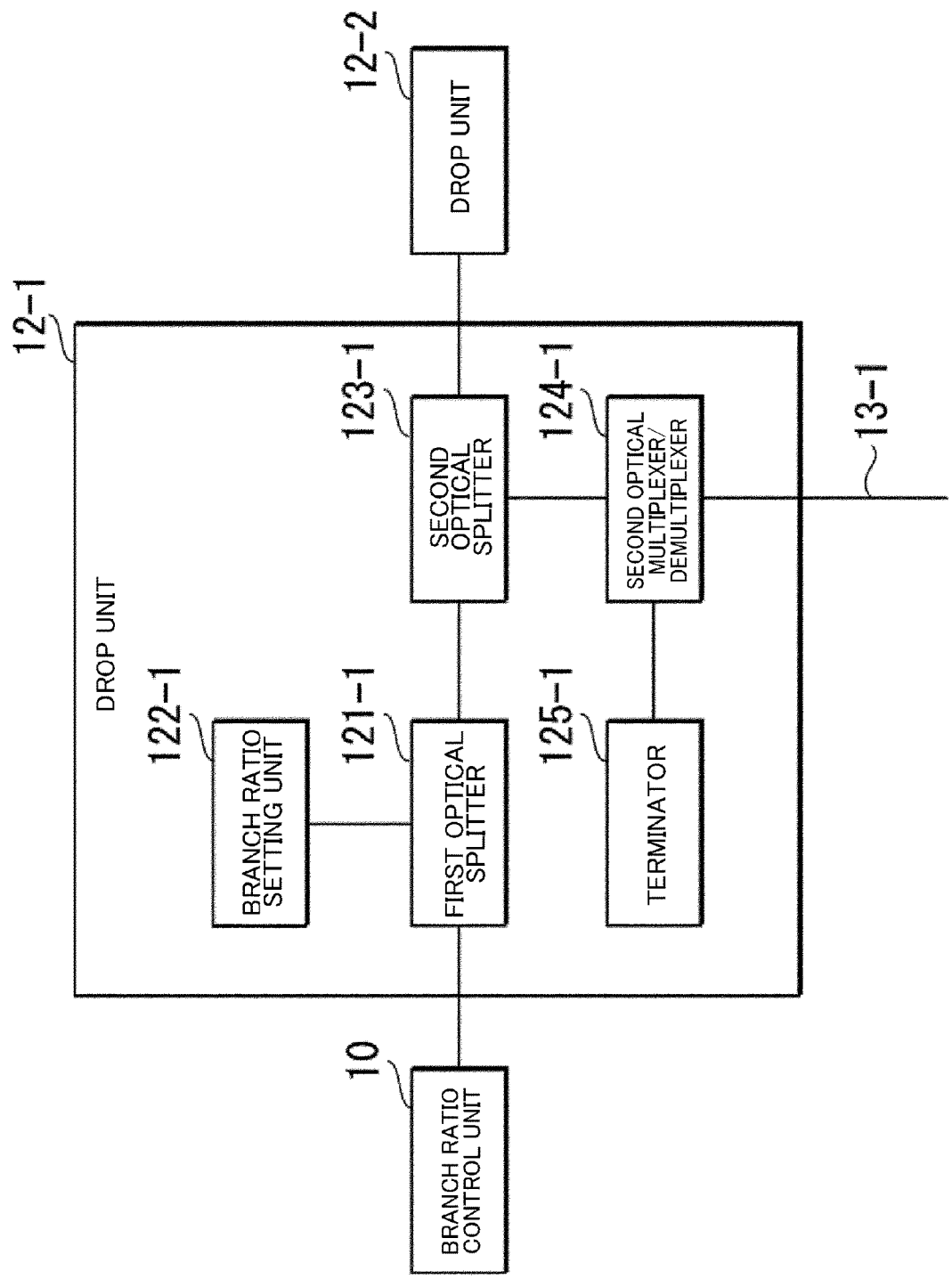
FIG. 3 is a diagram showing a configuration of a drop unit according to the first embodiment.

FIG. 3 is a diagram showing a configuration of the drop unit 12 according to the first embodiment.

The drop unit 12 includes a first optical splitter 121, a branch ratio setting unit 122, a second optical splitter 123, a second optical multiplexer/demultiplexer 124, and a terminator 125. Here, a first optical splitter 121-1, a branch ratio setting unit 122-1, a second optical splitter 123-1, a second optical multiplexer/demultiplexer 124-1, and a terminator 125-1, which are provided in the drop unit 12-1, will be described.

The first optical splitter 121-1 branches the light input from the branch ratio control unit 10, and outputs the branched light to the branch ratio setting unit 122-1 and the second optical splitter 123-1. The light input from the branch ratio control unit 10 includes a control signal output by the control signal transmission unit 101 and light output by the optical fiber measurement unit 102.

The transmittance of the first optical splitter 121-1 to the branch ratio setting unit 122-1 is defined as $S_1$, and the transmittance of the first optical splitter 121-1 to the second optical splitter 123-1 is defined as $T_1$. The sum of the transmittance $S_1$ and the transmittance $T_1$ is 1, and both $S_1$ and $T_1$ are 0 or more and 1 or less. The branch ratio of the first optical splitter 121 is defined as $S_1:T_1$.

The branch ratio setting unit 122-1 sets the branch ratio of the second optical splitter 123-1 based on the control signal received from the control signal transmission unit 101 via the first optical splitter 121-1. The branch ratio setting unit 122-1 includes, for example, a photodiode for receiving a control signal. The amount of data of the control signal received by the branch ratio setting unit 122-1 is significantly smaller than that of the optical signal generally used for optical communication. Therefore, the minimum received light intensity of the error-free control signal is significantly smaller than that of the main signal. Accordingly, the first optical splitter 121-1 is set to output most of the input light to the second optical splitter 123-1. The second optical splitter 123-1 is an optical splitter having a variable branch ratio. The second optical splitter 123-1 branches the light input from the first optical splitter 121-1 according to the set branch ratio, and outputs the branched light to the second optical multiplexer/demultiplexer 124-1 and a drop unit 12-2. The transmittance of the second optical splitter 123 to the second optical multiplexer/demultiplexer 124-1 is defined as $S_2$, and the transmittance of the second optical splitter 123 to the drop unit 12-2 is defined as $T_2$. The sum of the transmittance $S_2$ and the transmittance $T_2$ is 1, and both $S_2$ and $T_2$ are 0 or more and 1 or less. The branch ratio of the second optical splitter 123 is defined as $S_2:T_2$.

The second optical multiplexer/demultiplexer 124-1 demultiplexes the light input from the second optical splitter 123-1 and outputs the demultiplexed light to the terminator 125-1 and incidents the demultiplexed light on the branch fiber 13. The second optical multiplexer/demultiplexer 124-1 is designed to output light of the wavelength of the measured light to the terminator 125-1. The terminator 125-1 terminates the light input from the second optical multiplexer/demultiplexer 124-1. The optical fiber measurement unit 102 outputs the measured light and measures the light scattered backward by the trunk fiber 14 and returned to measure the branch ratio in the drop unit 12-1. Therefore, when the backscattered light generated in the branch fiber 13-1 returns to the optical fiber measurement unit 102, there is a likelihood that the optical fiber measurement unit 102 will not be able to perform accurate measurement because it is confused with the light that is backscattered and returned by the trunk fiber 14. Therefore, the drop unit 12-1 includes the second optical multiplexer/demultiplexer 124-1 and the terminator 125-1 so that the backscattered light of the measured light incident on the branch fiber 13-1 is prevented from returning to the optical fiber measurement unit 102.

When the optical fiber measurement unit 102 can measure the distance and loss of the optical fiber even if the measured light is incident on the branch fiber 13-1, the drop unit 12-1 need not include the second optical multiplexer/demultiplexer 124-1 and the terminator 125-1.

Hereinbefore, the first optical splitter 121-1, the branch ratio setting unit 122-1, and the second optical splitter 123-1, which are provided in the drop unit 12-1, have been described. The internal configuration of the drop units 12-2, ... 12-N is the same as the internal configuration of the drop unit 12-1, but the connection relationship with the outside is different. For example, the first optical splitter 121-2 provided in the drop unit 12-2 branches the light input from the drop unit 12-1. Further, a second optical splitter 123-2 provided in the drop unit 12-2 outputs the branched light to a drop unit 12-3 and incidents the branched light on the branch fiber 13-1.

Hereinafter, for convenience, the branch ratio of the first optical splitter 121 will be described as $S_1:T_1$, and the branch ratio of the second optical splitter 123 will be described as $S_2:T_2$, but this does not mean that the branch ratio $S_1:T_1$ and the branch ratio $S_2:T_2$ are equal in all the drop units 12. The branch ratio of the first optical splitter 121 and the branch ratio of the second optical splitter 123 may be different depending on the drop unit 12.

<<Control Signal>>

Here, the control signal output by the control signal transmission unit 101 will be described in detail. The control signal transmission unit 101 outputs two kinds of control signals. One is an initialization signal, and the other is a branch ratio determination signal.

The initialization signal is output in order to distribute the measured light output by the optical fiber measurement unit 102 to the entire trunk fiber 14 by initializing the branch ratio $S_2:T_2$ of each drop unit 12, and to enable the measurement by the optical fiber measurement unit 102. This is because there is a likelihood that the measured light does not reach the entire trunk fiber 14 depending on the branch ratio of the second optical splitter 123. The branch ratio setting unit 122 of each drop unit 12 that has received the initialization signal sets the branch ratio of the second optical splitter 123 to an initial value. The initial value of the branch ratio is set to a value which allows the optical fiber measurement unit 102 to correctly perform measurement by using a previous experiment or simulation.

Since the initialization signal is sufficient by binary information indicating whether or not the branch ratio setting unit 122 performs initialization, a clock or a fixed pattern may be used.

The branch ratio determination signal is output to set the branch ratio of the second optical splitter 123 to a value other than the initial value.

Each branch ratio setting unit 122 that has received the branch ratio determination signal sets branch ratio of each second optical splitter 123 based on the received branch ratio determination signal.

The control signal is received by the branch ratio setting unit 122 via the first optical splitter 121. When the designer of the optical communication system can use the branch ratio setting system 1 as an optical communication system by replacing the branch ratio control unit 10 with the OLT and connecting the ONU to the end point opposite to the end point connected to the drop unit 12 of the branch fiber 13. When the branch ratio setting system 1 is used as an optical communication system, it is desirable that the transmittance $S_1$ of the first optical splitter 121 be small because the loss of the optical signal exchanged between the OLT and the ONU is small. Therefore, the control signal transmission unit 101 can cause the branch ratio setting unit 122 to correctly receive the control signal while reducing the transmittance $S_1$ by lowering the transmission rate of the control signal and improving the reception sensitivity in the branch ratio setting unit 122.

Figure 4:
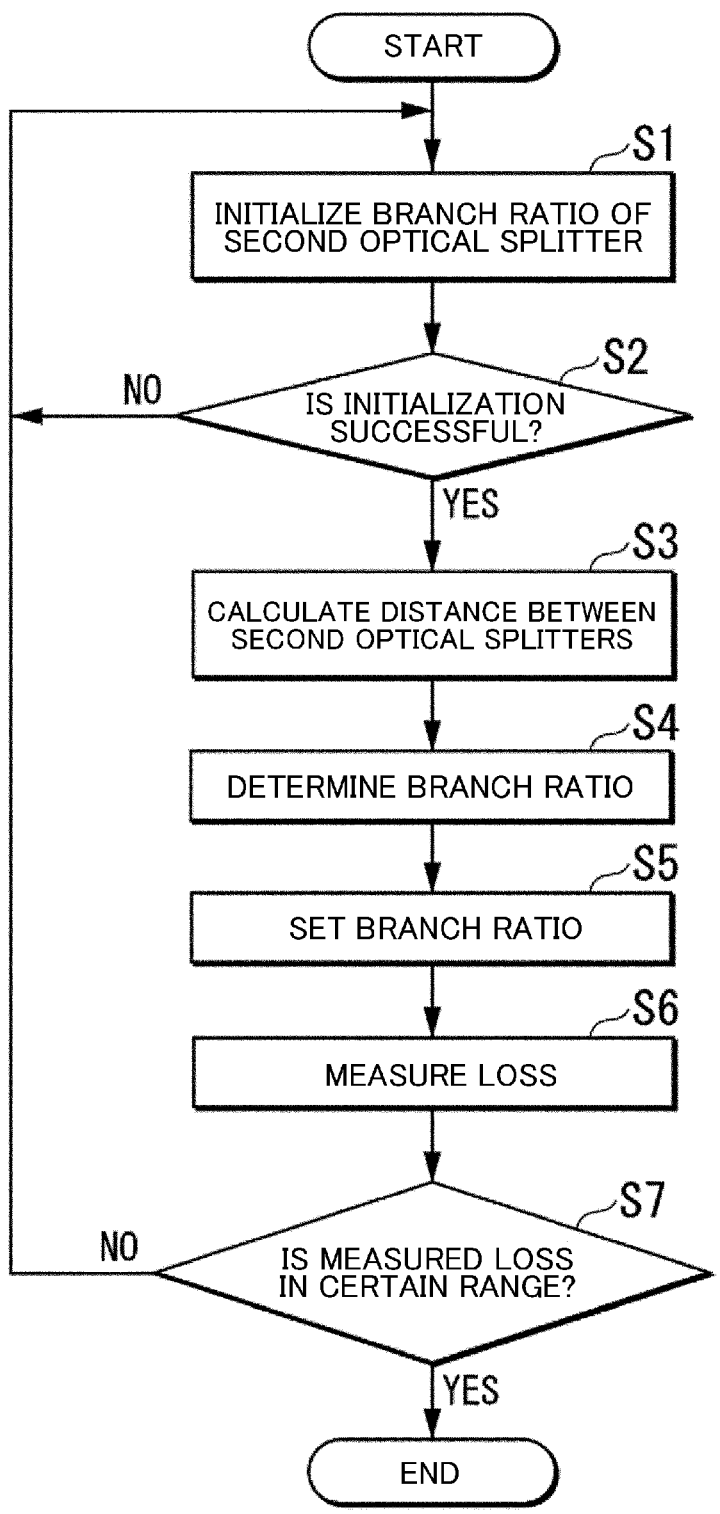
FIG. 4 is a flowchart showing an operation of the branch ratio setting system according to the first embodiment.

FIG. 4 is a flowchart showing the operation of the branch ratio setting system 1 according to the first embodiment.

First, the control signal transmission unit 101 transmits an initialization signal to each drop unit 12, and the branch ratio setting unit 122 initializes the branch ratio of the second optical splitter 123 (step S1). The determination unit 105 measures a loss in the trunk fiber 14 and determines whether or not the initialization is successful (step S2). For example, the determination unit 105 determines that initialization is successful when all drop units 12 assumed by the optical fiber measurement unit 102 are detected. More specifically, when the optical fiber measurement unit 102 can detect the local change of the loss indicated by the portion B in FIG. 2 by the number of the drop units 12, it can be said that all the assumed drop units 12 were detected. When the determination unit 105 determines that the initialization has failed (step S2: NO), the control signal transmission unit 101 performs the operation of step S1 again. When the determination unit 105 determines that the initialization is successful (step S2: YES), the optical fiber measurement unit 102 measures the loss received by the optical signal between the respective second optical splitters 123 in the trunk fiber 14 (step S3). For example, the optical fiber measurement unit 102 outputs light to the trunk fiber 14, measures the light scattered and returned, and thereby measures the loss received by the optical signal between the second optical splitters 123.

The branch ratio determination unit 104 determines the branch ratio of the second optical splitter 123 based on the measured loss (step S4). For example, when the branch ratio determination unit 104 changes a configuration of a part of the branch ratio setting system 1 and uses the configuration as an optical communication system, the branch ratio determination unit 104 determines the branch ratio of 123 so that the intensities of the optical signals received by all ONUs connected to the branch fiber 13 are equal. The control signal transmission unit 101 transmits a branch ratio determination signal carrying information on the branch ratio of each second optical splitter 123 determined by the branch ratio determination unit 104. The branch ratio setting unit 122 sets the branch ratio of the second optical splitter 123 based on the received control signals (step S5). Next, the optical fiber measurement unit 102 measures the loss in the trunk fiber 14 (step S6). The determination unit 105 compares the loss calculated from the branch ratio determined by the branch ratio determination unit 104 with the loss measured by the optical fiber measurement unit 102, and determines whether or not the setting of the branch ratio of the second optical splitter 123 is successful (step S7). For example, the determination unit 105 determines that the setting of the branch ratio is successful when the loss measured by the optical fiber measurement unit 102 is included in a range of the loss calculated from the branch ratio determined by the branch ratio determination unit 104 and the error. When the determination unit 105 determines that the setting has failed (step S7: NO), the branch ratio setting system 1 repeats the operation from step S1. When the determination unit 105 determines that the setting has failed (step S7: YES), the branch ratio setting system 1 ends the operation.

After the operation of the branch ratio setting system 1 is ended, the branch ratio control unit 10 is replaced with an OLT, and the ONU is connected to an end point opposite to an end point connected to the drop unit 12 of the branch fiber 13, so that communication can be performed between the OLT and the ONU.

<<Action and Effect>>

As described above, according to the first embodiment, the branch ratio determination unit 104 determines the branch ratio of the drop unit 12 based on the measurement result of the optical fiber measurement unit 102. Thereafter, the control signal transmission unit 101 transmits a control signal, and the branch ratio of the drop unit 12 is set to the branch ratio determined by the branch ratio determination unit 104. Thus, it is not necessary to prepare various kinds of optical splitters, and the branch ratio of the drop unit 12 at a remote place can be controlled by the branch ratio control unit 10, which leads to cost reduction and work simplification.

Second Embodiment

Figure 5:
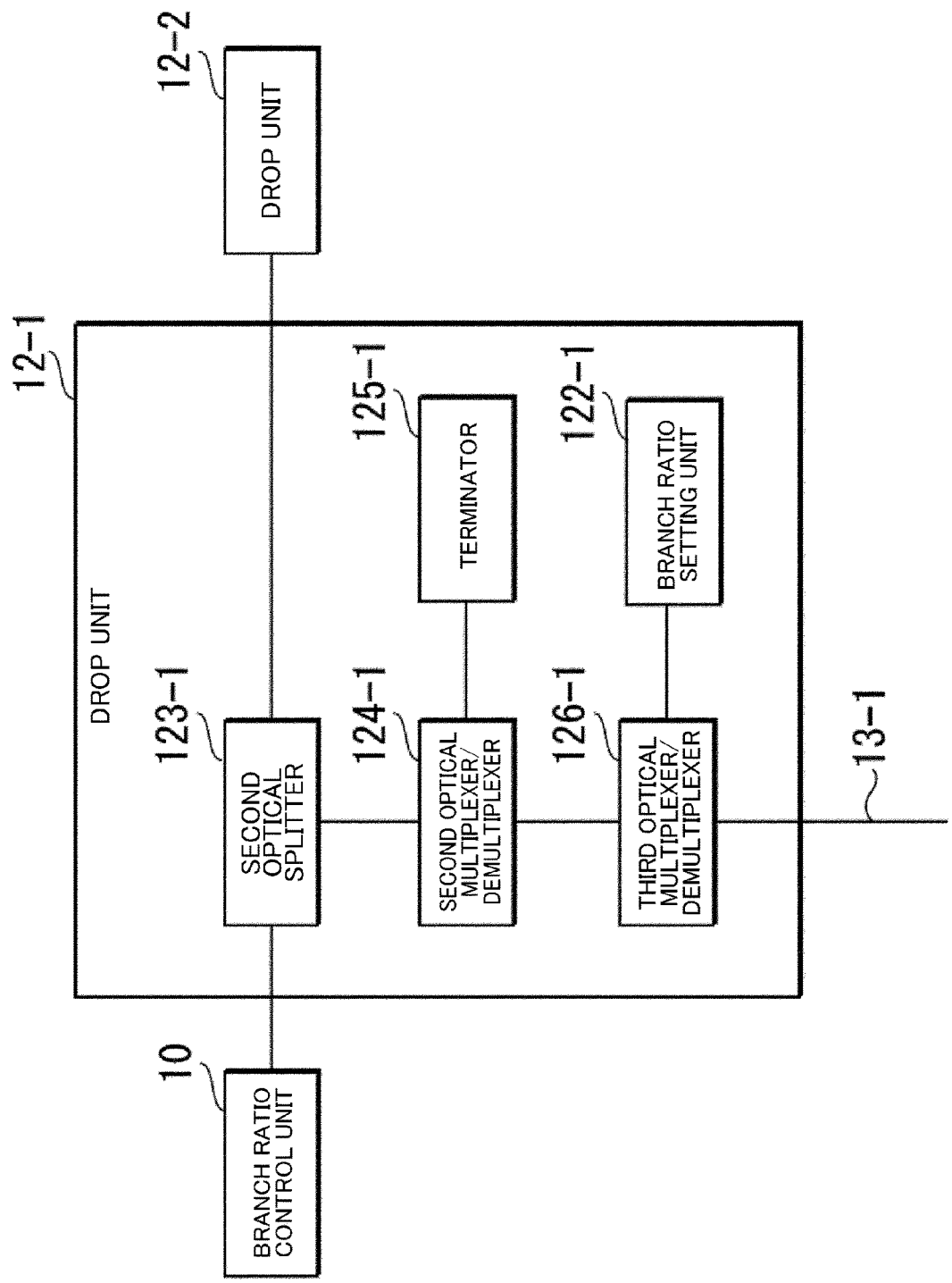
FIG. 5 is a diagram showing a configuration of a drop unit according to a second embodiment.

FIG. 5 is a diagram showing a configuration of a drop unit 12 according to a second embodiment.

The drop unit 12 according to the second embodiment further includes a third optical multiplexer/demultiplexer 126 in addition to the configuration of the first embodiment on the side opposite to the second optical splitter 123 in the branch fiber 13. In the drop unit 12 according to the second embodiment, the branch ratio setting unit 122 is connected to the third optical multiplexer/demultiplexer 126. In addition, the drop unit 12 according to the second embodiment does not have to include the first optical splitter 121 unlike the configuration of the first embodiment.

In the drop unit 12 according to the second embodiment, the control signal transmitted by the control signal transmission unit 101 is received by the branch ratio setting unit 122 via the second optical splitter 123 and the third optical multiplexing/demultiplexing unit 126.

In the drop unit 12 according to the second embodiment, a restriction is applied in advance so that the transmittance $S_2$ of the second optical splitter 123 takes a value equal to or higher than a certain value. Thus, the branch ratio setting unit 122 can correctly receive the control signal regardless of the value of the transmittance $S_2$. As in the first embodiment, the reception sensitivity of the branch ratio setting unit 122 may be improved by lowering the transmission rate of the control signal.

<<Action and Effect>>

As described above, according to the second embodiment, the branch ratio setting unit 122 receives the control signal via the second optical splitter 123. Thus, the loss in the first optical splitter is eliminated, and the optical communication system with less loss can be provided.

Other Embodiments

Although the embodiments of the present invention have been described in detail above with reference to the drawings, the specific configuration is not limited to such embodiments, and various design changes and the like can be made without departing from the spirit and scope of the present invention.

For example, in the above-described embodiment, the control signal transmission unit 101 and the optical fiber measurement unit 102 transmit the control signal and the measured light, respectively, but the wavelengths of the control signal and the measured light may be the same. In this case, the branch ratio control unit 10 may not include the first optical multiplexer/demultiplexer 103, and the drop unit 12 according to the second embodiment may not include the second optical multiplexer/demultiplexer 124 and the terminator 125. When the wavelength of the control signal is different from that of the measured light, the third optical multiplexer/demultiplexer 126 may be replaced with an optical splitter.

The branch ratio control unit 10 and the drop unit 12 include a central processing unit (CPU), a memory, an auxiliary storage device, and the like connected by a bus. The branch ratio control unit 10 functions as a device including the control signal transmission unit 101, the optical fiber measurement unit 102, the branch ratio determination unit 104, and the determination unit 105 by executing a program, and the drop unit 12 functions as a device including the branch ratio setting unit 122 by executing a program. Note that all or some of the functions of the branch ratio control unit 10 and the drop unit 12 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. The program may be transmitted via an electrical communication line.

REFERENCE SIGNS LIST

1 Branch ratio setting system
10 Branch ratio control unit
12 Drop unit
13, 93 Branch fiber
14, 94 Trunk fiber
101 Control signal transmission unit
102 Optical fiber measurement unit
103 First optical multiplexer/demultiplexer
104 Branch ratio determination unit
105 Determination unit
121 First optical splitter
122 Branch ratio setting unit
123 Second optical splitter
124 Second optical multiplexer/demultiplexer
125 Terminator
126 Third optical multiplexer/demultiplexer
90 OLT
91 ONU
92 Equally branched optical splitter
95 Unequally branched optical splitter

The invention claimed is:

1. A branch ratio setting system comprising:
a branch ratio control unit; and
a plurality of drop units configured to be able to receive an optical signal from the branch ratio control unit, and configured to branch and output the received optical signal,
wherein the branch ratio control unit outputs light to the plurality of drop units via an optical fiber to measure characteristics of the optical fiber, and outputs a branch ratio determination signal to each of the plurality of drop units via the optical fiber based on the measured characteristics of the optical fiber, and
the drop unit includes an optical splitter connected to the optical fiber and having a variable branch ratio and a branch ratio setting unit that sets the branch ratio of the optical splitter based on the branch ratio determination signal input via the optical fiber.

2. The branch ratio setting system according to claim 1, wherein the branch ratio control unit outputs an initialization signal to the optical fiber before outputting the branch ratio determination signal, and initializes the branch ratio of the optical splitter.

3. The branch ratio setting system according to claim 2, wherein the branch ratio control unit measures the characteristics of the optical fiber after outputting the initialization signal, and determines whether to output the initialization signal to the optical fiber again.

4. A method for producing an optical communication system, the method comprising:
a system configuration step of configuring a tree structure network in which a branch ratio control unit is used as a root node and a plurality of drop units provided with an optical splitter having a variable branch ratio are used as intermediate nodes or leaf nodes;
a measurement step in which the branch ratio control unit outputs light to an optical fiber connected between the branch ratio control unit and the drop unit to measure characteristics of the optical fiber;
a branch ratio determination signal output step in which the branch ratio control unit outputs a branch ratio determination signal to the drop unit via the optical fiber based on the measured characteristics of the optical fiber;
a branch ratio setting step in which the drop unit sets the branch ratio of the optical splitter based on the branch ratio determination signal input via the optical fiber; and
a communication device preparation step of replacing the branch ratio control unit with a communication device and connecting the communication device to the optical splitter.

5. An optical branch device comprising:
an optical splitter having a variable branch ratio; and
a branch ratio setting unit that is connected to the optical splitter via an optical fiber and sets the branch ratio of the optical splitter based on a branch ratio determination signal input from the outside via the optical fiber.

* * * * *